NETWORK FOR EXTENDING THE RANGE OF A VOLTAGE DIVIDER

Filed Oct. 14, 1963

2 Sheets-Sheet 1

INVENTOR.
LOEBE JULIE
BY Eugene S. Lovette
ATTORNEY

Feb. 21, 1967 L. JULIE 3,305,769

NETWORK FOR EXTENDING THE RANGE OF A VOLTAGE DIVIDER

Filed Oct. 14, 1963 2 Sheets-Sheet 2

INVENTOR
LOEBE JULIE

BY

Eugene S. Lovette
ATTORNEY

United States Patent Office 3,305,769
Patented Feb. 21, 1967

3,305,769

NETWORK FOR EXTENDING THE RANGE OF A VOLTAGE DIVIDER

Loebe Julie, Riverdale, N.Y., assignor to Julie Research Laboratories, Inc., New York, N.Y., a corporation of New York Filed Oct. 14, 1963, Ser. No. 315,831
10 Claims. (Cl. 323—74)

This invention relates to an extended range ratio voltage divider system and means of establishing same.

A voltage divider is essentially an interpolation device for obtaining intermediate values of resistance or voltage up to the value of resistance at or voltage applied to the divider input. For example, when a voltage of preset value is applied across the divider input, and by varying the divider slide arm or dial setting, the divider provides an output voltage from a value of zero up to the value equal to the input voltage. The range of values provided at the output of known prior art dividers are normally characterized by incomplete or poor resolution for the low values of output voltage and resistance. Among the advantages of the invention herein, it is the intention of the present invention to provide a divider circuit which is not characterized by this limitation of prior art divider circuits.

It is the principal object of the invention to provide an extended range ratio voltage divider system and means of establishing same, wherein the divider system is characterized by successive output ranges related by progressively decreasing decimal values to produce complete linear resolution outputs even for extremely small values of voltage or resistance.

It is a further object of the invention to provide an extended range ratio voltage divider system and means of establishing same, wherein the voltage divider characterized by a fixed constant input impedance is capable of providing progressively decreasing ranges of output voltages and resistances by means of impressing interrelated values of resistances in the input to the divider, and wherein such resistances are related to the divider input impedance so that the individual resistances in the divider input may be intercompared in an accumulative manner by standard intercomparison means to assure the stability, precision and accuracy of the divider system and its output to within 1 part per million accuracies.

It is a further object of the invention to provide an extended range ratio voltage divider system and means of establishing same capable of providing successive ranges of decimally related outputs, wherein the input of the composite system is characterized by a constant fixed value impedance for all decimally related ranges of output.

Further objects and advantages will become apparent from the following description of the invention taken in conjunction with the figures, in which.

Figure 1:
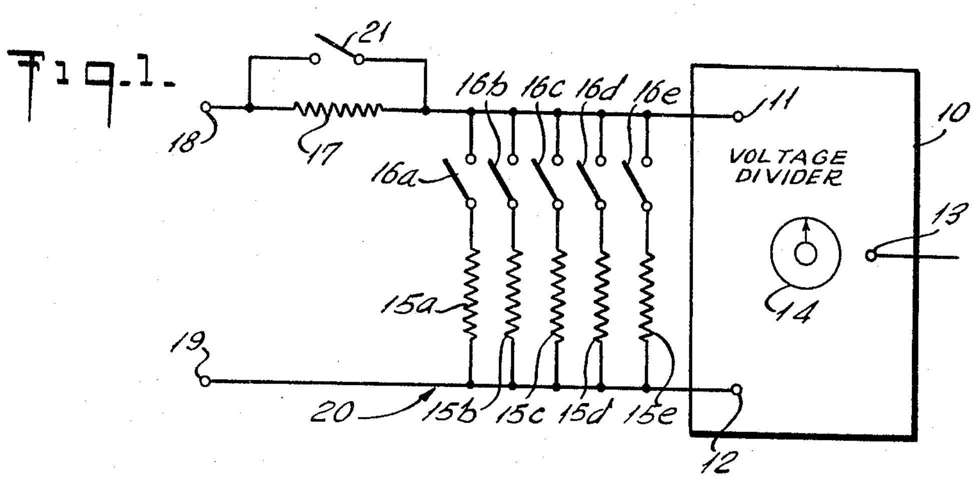
FIG. 1 depicts a schematic of an extended range voltage divider system in accordance with the invention.

Reference is made to FIG. 1, wherein reference number 10 depicts a three terminal voltage divider characterized by a constant input impedance of known and fixed value, and further characterized by a linear transfer ratio. Terminals 11, 12 depict the input terminals of divider 10. The output from divider 10 is taken from the third terminal 13 to the low end terminal 12. One may refer to my co-pending application, Serial No. 195,680, filed May 18, 1962, now Patent 3,179,880, issued April 20, 1965, and entitled "Impedance Measuring Apparatus," for further information concerning a voltage divider characterized as described and contemplated herein.

In particular, divider 10 may be a six decade Kelvin-Varley voltage divider accurate to 0.0001%, i.e., 1 part per million (1 p.p.m.). The transfer ratio of such divider and thus the output resistance looking into terminals 13–12, may be varied linearly by linear variation of the decade dial 14. In other words, it will be understood that adjustment of dial 14 varies the internal impedances constituting divider 10 so as to change its transfer ratio, whereby its output impedance will vary accordingly. Consequently, dial 14 may be calibrated for providing a direct reading of voltage divider output. With the circuit as shown in FIG. 1, when one volt is applied across the divider, the input terminals 11–12, voltage divider 10 will normally provide a resolution of voltages from zero to one volt at its output 13–12. It will now be shown that by selectively applying preset resistors across the divider input in accordance with the principles of the invention, the output of the divider automatically provides a scaled range of output from 0 to .1 volt, 0 to .01 volt, 0 to .001 volts, etc. Accordingly, the system incorporating the invention is designed to serve as a decimal multiplier of the value read upon divider dial 14. For example, an output dial setting of 324600 with one volt applied to the system input will provide output voltages of 0.3246 volt, 0.03246 volt, 0.003246 volt, etc., by switching appropriate resistors in parallel with the divider input.

In accordance with the invention, a plurality of individual resistors 15a, 15b, 15c, 15d, 15e, etc., are impressed in parallel across divider input 11–12 by closing respective switches 16a, 16b, 16c, 16d, 16e, etc., in series with each resistor. Hence, when switch 16a is closed, resistor 15a is inserted in parallel across the input 11–12 of divider 10. Likewise, when switch 16b is closed, resistor 15b is across the input of divider 10, etc. A resistor 17 is in series with the foregoing parallel combination by connecting resistor 17 between the terminal 18 and 11. The input to the entire extended range ratio divider device 20 is across input terminals 18–19. Terminal 19 is common with terminal 12.

Since voltage divider 10 is a constant input impedance device, the input impedance thereof may be referred to herein as Z. In accordance with the invention, the values of the associated resistors 15a through 15e and resistor 17 are selected so as to provide for correct decimal multipliers for the divider and these values are as follows:

Resistor 17 has a value 9Z
Resistor 15a has a value $Z/10$
Resistor 15b has a value $Z/100$
Resistor 15c has a value $Z/1,000$
Resistor 15d has a value $Z/10,000$
Resistor 15e has a value $Z/100,000$ In order to obtain an output range from zero to one, switches 16a through 16e are all open, and a switch 21 is closed to short out resistor 17. This provides the multiplier factor of 1. In other words, with one volt impressed across terminals 18–19, the output from divider 10 is zero to one volt depending upon the setting of dial 14. In order to obtain the operating range of 0 to 0.1, a multiplier of .1, all switches 16a through 16e are open and switch 21 is open. It will be understood for the discussion hereinafter, that switch 21 remains open whenever resistor 17 is employed in the circuit. For a multiplier of .01 to provide the range of 0 to 0.01, switch 16*a* is closed, whereas the other switches 16*b* through 16*e* remain open. For a multiplier of .001, switches 16*a* and 16*b* are closed. For a multiplier of .0001, switches 16*a*, 16*b* and 16*c* are closed, etc.

Figure 2:
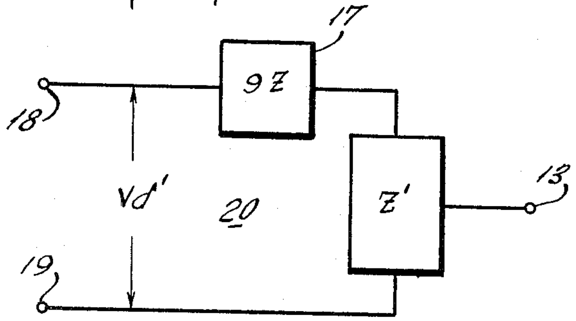
FIG. 2 is a simplified schematic of the circuit shown in FIG. 1.

The mathematical proof for the above system can be understood from the following development. In closing any of the switches 16*a* through 16*e*, the respective resistors 15*a* through 15*e* are placed in parallel across input 11–12 to divider 10. The input of divider 10 then becomes the equivalent of a parallel combination made up of the input impedance Z of divider 10 and the resistors in parallel with same, and this equivalent parallel combination is referred to herein as Z'. Z' is in series with resistor 17. The latter has the value of 9Z. The complete series combination is shown in FIG. 2.

The input voltage at divider terminals 11–12, V*d*, may be expressed in terms of the extended range input voltage V*d'* impressed across terminals 18–19 as follows:

$$Vd=\left[\frac{Z'}{9Z+Z'}\right]\times Vd' \qquad (1)$$

The maximum value of output voltage for a selected range is the term $Z'/[9Z+Z']$ for $Vd'=1$ volt. Such maximum value is the multiplier factor of the extended range device. For example, with all switches 16*a* through 16*e* open, the value of Z' is equal to Z, the input impedance of divider 10. The multiplier factor for divider device 20 for this condition is:

$$\frac{Z}{9Z+Z}=\frac{1}{10}=0.1$$

Hence, the output range of divider 10 covers the scale of 0 to 0.1 volt for $Vd'=1$ volt, wherein from Equation 1, $Vd=0.1$ volt.

With switch 16*a* closed and resistance $15a=Z/10$ ohms in parallel with the divider input impedance Z, the parallel combination Z' is:

$$Z'=\frac{Z\times\frac{Z}{10}}{Z\times\frac{Z}{10}}=\frac{\frac{Z^2}{10}}{\frac{11Z}{10}}=\frac{Z}{11}$$

and from Equation 1, the multiplier factor is:

$$\frac{\frac{Z}{11}}{9Z+\frac{Z}{11}}=\frac{\frac{Z}{11}}{\frac{100Z}{11}}=0.01$$

whereby the output range is zero to 0.01 volt for $Vd'=1$ volt and $Vd=.01$ volt.

Upon closing switches 16*a* and 16*b*, resistors 15*a* and 15*b* are placed in parallel with the divider input Z, whereby Z' is the parallel combination of Z, $Z/10$ and $Z/100$.

$$Z'=\frac{1}{\frac{1}{Z}+\frac{10}{Z}+\frac{100}{Z}}=\frac{Z}{111}$$

whereby the multiplier factor from Equation 1 is:

$$\frac{\frac{Z}{111}}{9Z+\frac{Z}{111}}=0.001$$

Hence, for this condition, the output scale is 0 to 0.001 volt and $Vd=0.001$ volt.

When resistors 15*a*, 15*b*, 15*c* are in parallel with Z, the multiplier factor becomes 0.0001; the output scale is 0 to 0.0001 volt and $Vd=0.0001$ volt.

When resistors 15*a* to 15*d* are across Z, the multiplier factor becomes 0.00001 and the scale becomes 0 to 0.00001 volt with $Vd=0.00001$ volt.

When all resistors 15*a* through 15*e* are across Z, the multiplier factor is 0.000001.

Figure 4:
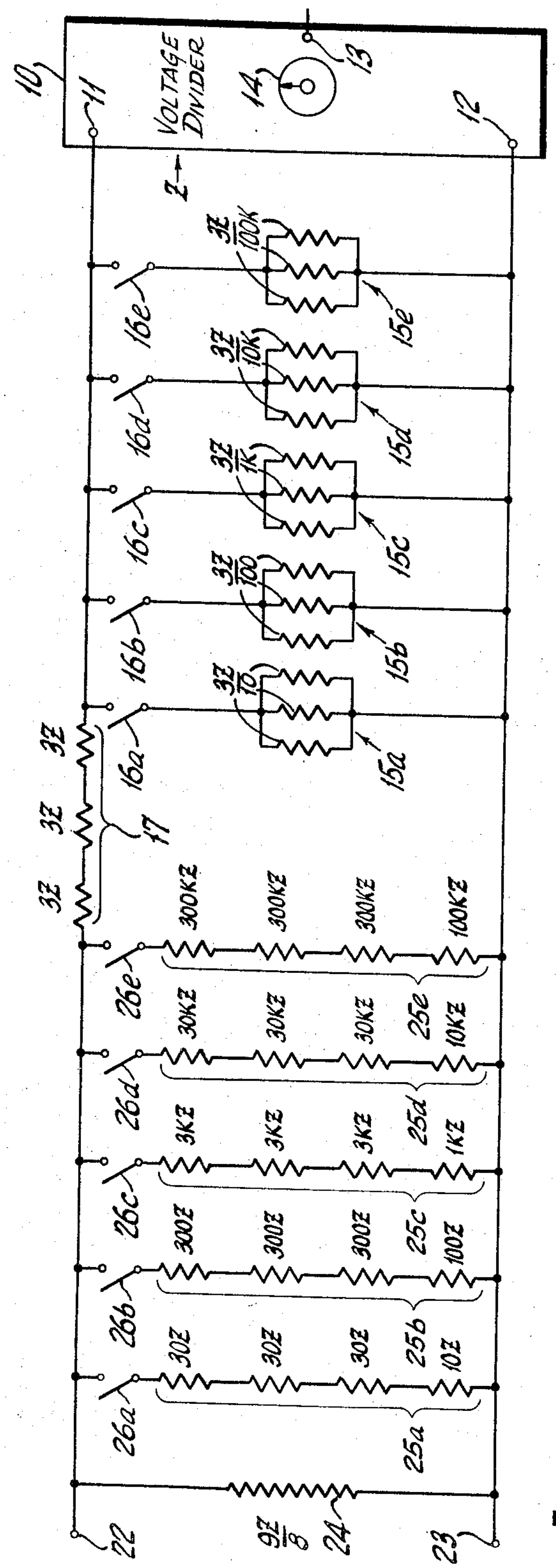
FIG. 4 is a schematic of the invention showing the synthesized impedances capable of calibration to the accuracy of the voltage divider.

In order to provide accurate multiplier factors, the values of the individual resistors 15*a* through 15*e* and resistor 17 must be a precise integral of the value of impedance Z as shown in FIG. 4. A unique benefit of the described system of extending the range is the fact that all of the impedances are integrally related to the divider input impedance Z and thus these resistors can easily be intercompared. Using the "bootstrap" standard method of intercomparing resistors of like nominal value and obtaining a null between them, it is possible to obtain precise and accurate values for all resistors. The highly accurate value of the input impedance of the divider is employed as the initial standard against which the other resistors are compared and established.

Beginning with resistor 17 which is selected to have a value 9Z, this resistor may be synthesized of three resistors in series each having a value of 3Z to provide a total resistance of 9Z. In order to calibrate and establish the 9Z value so as to determine it to be a precise integral of the Z value of voltage divider, the three 3Z resistors making up resistor 17 are placed in parallel. The parallel combination of three 3Z resistors is Z. This can be intercompared with the known value Z of voltage divider 10 to calibrate the value of 9Z.

Resistor 15*a* of value $Z/10$ is synthesized of three parallel resistors each of value $3Z/10$. The parallel combination of the three resistors of value $3Z/10$ is $Z/10$. These three resistors are connected in series in order to calibrate and set the accuracy of same. The series connected resistors will provide a total resistance of $9Z/10$. This value can be intercompared with the precise values of Z and 9Z. The resistor 17 of value 9Z has already been accurately calibrated by previous intercomparison with the value of Z of divider 10. Placing Z in parallel with 9Z produces an equivalent impedance of $9Z/10$. The three resistors each of value $3Z/10$ thus are accurately measured and determined to constitute the value $Z/10$ for resistor 15*a*.

The resistor 15*b* of value $Z/100$ should consist of three resistors in parallel and each of value $3Z/100$. Placing these three resistors in parallel, produces the desired value of $Z/100$. To intercompare these with the previously determined accurate resistors, i.e. Z and resistors 17, 15*a*, the three resistors of value $3Z/100$ are connected in series to produce a total resistance of $9Z/100$. An equivalent resistance of $9Z/100$ is produced by placing resistors Z, 9Z (resistor 17) and $Z/10$ (resistor 15*a*) in parallel, whereby the value $Z/100$ can be accurately measured and determined.

In a similar manner, each of the resistors 15*c* through 15*e* are synthesized and calibrated. For example, resistor 15*c* has a value of $Z/1{,}000$ and will be made up of three resistors in parallel, each of a value of $3Z/1{,}000$. To measure and establish the precision of these resistors, they are placed in series to provide a series value of $9Z/1{,}000$ and this value is intercompared with the parallel combination of Z, 9Z, $Z/10$ and $Z/100$. The latter parallel combination provides an equivalent resistance of $9Z/1{,}000$.

The resistor 15*d* will be made up of a combination of three resistors in parallel, each of a value of $3Z/10{,}000$; whereas the resistor 15*e* is made up of three parallel resistors each $3Z/100{,}000$ in value. These resistors may be measured and determined as indicated hereinbefore.

Consequently, if the constant input impedance of divider 10 is selected to be 100K ohms, resistor 17 will have the value of 900K ohms. Furthermore, resistor 17 will be made up of three 300K ohm resistors in series. Resistor 15*a* will have the value of 10K ohms and is made up of three 30K ohm resistors in parallel. Resistor 15*b* will have the value of 1K ohm and is made up of three 3K ohm resistors in parallel. Resistor 15*c* will have the value of 100 ohms and is made up of three 300 ohm resistors in parallel. The values for resistor 15*d* and resistor 15*e* will be 10 ohms and 1 ohm, respectively, and will be made up of three parallel resistors each 30 ohms for resistor 15*d* and each 3 ohms for resistor 15*e*.

The system described hereinbefore provides an extended range ratio divider device. However, it will be noted that the input impedance looking into terminals 18–19 is no longer a constant value. For example, when switch 21 is closed to short resistor 17 and all switches 16*a*, 16*b*, etc., are open, the input impedance equals Z. On the other hand, when switch 21 remains open and all switches 16*a*, 16*b*, etc., are also open, the input impedance at terminals 18–19 is 10Z. Then when switch 16*a* is closed, the input impedance becomes $100Z/11$. When switches 16*a* and 16*b* are closed, the input impedance becomes $1{,}000Z/111$; and when 16*a* through 16*c* are closed, the input impedance becomes $10{,}000Z/1{,}111$. In general, the input impedance at terminals 18–19 approaches 9Z upon increasing the number of resistors 15*a*, 15*b*, etc., impressed in parallel across Z, and this is seen from the following general expression with resistor 17 in the circuit:

$$Z_{18-19}=$$

$$9Z+\frac{1}{\frac{1}{Z}+\frac{10}{Z}+\frac{100}{Z}+\ldots}=9Z+\frac{Z}{1+10+100+\ldots}=$$

$$Z\left[\frac{10+90+900+\ldots}{1+10+100+\ldots}\right]$$

Figure 3:
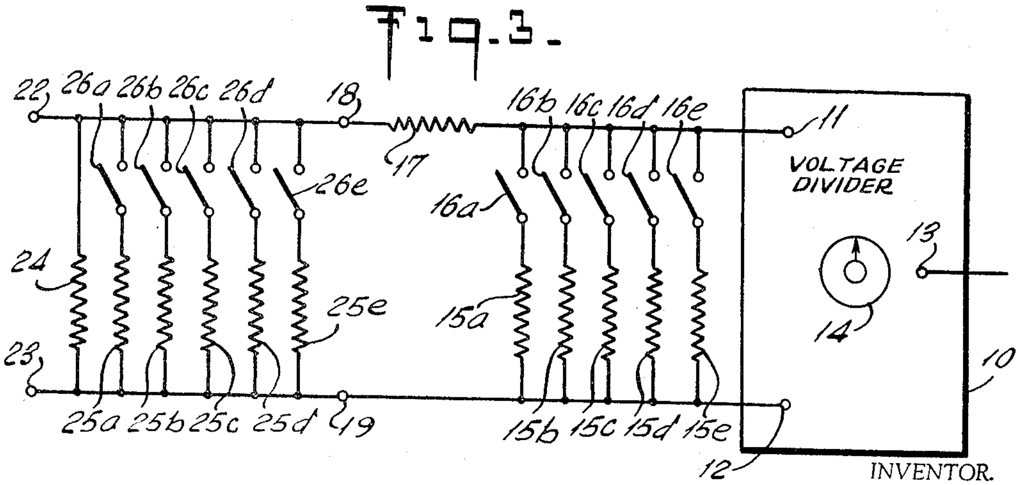
FIG. 3 is a schematic of a second embodiment of the invention arranged to provide a constant and fixed value input impedance for the composite system for all ranges of operation.

FIG. 3 illustrates a second version of the extended range ratio divider system, wherein additional resistors are added in parallel to terminals 18–19 for the purpose of maintaining the input impedance now looking into terminals 22, 23 at the fixed value of Z, where Z is the input impedance of divider 10. In accordance with this version of the invention, a fixed resistor 24 is inserted in parallel across terminals 18–19. In addition, a plurality of resistors 25*a*, 25*b*, 25*c*, 25*d*, 25*e*, etc. are in series with respective switches 26*a*, 26*b*, 26*c*, 26*d*, 26*e*, etc., so that any one or more of said resistors may be impressed across terminals 18–19. With the input impedance of voltage divider 10 designated as Z, the values of resistors 25*a* through 25*e*, etc., are related to the value of Z in the following manner:

Resistor 24 has a value of $9Z/8$
Resistor 25*a* has a value of 100Z
Resistor 25*b* has a value of 1,000Z
Resistor 25*c* has a value of 10,000Z
Resistor 25*d* has a value of 100,000Z
Resistor 25*e* has a value of 1,000,000Z Understanding that the impedance looking into terminals 22–23 is a fixed value equal to Z, it will be seen that when a multiplier factor of 0.1 is desired all switches 16*a* through 16*e* are open and all switches 26*a* through 26*e* will be closed. Resistor 17 for the discussion hereinafter is always in the circuit, hence switch 21 is not shown in FIG. 3.

To continue, in order to provide a multiplier factor of 0.01, switch 16*a* is closed and switch 26*a* is opened, whereas the other switches 26*b* through 26*e* remain closed. For a multiplier factor of 0.001, switches 16*a*, 16*b* are closed and switches 26*a*, 26*b* are opened. For a multiplier factor of 0.0001, switches 16*a*, 16*b*, 16*c* are closed and switches 26*a*, 26*b*, 26*c* are opened. The next multiplier factor 0.00001 is established by closing switches 16*a* . . . 16*d* and opening switches 26*a* . . . 26*d*. Finally, for the multiplier factor of 0.000001, switches 16*a* through 16*e* are closed and switches 26*a* through 26*e* are opened.

The mathematical proof for the circuit of FIG. 3 to provide the extended range ratio divider characterized by a fixed value input impedance, will be understood from the following development.

With all switches 16*a* through 16*e* open, the impedance looking into the right of terminals 18–19, i.e. the impedance $9Z+Z'$ as seen in FIG. 2, is 10Z. If the impedance looking into terminals 22–23 is Z, an equivalent impedance of Zx should be impressed in parallel with 10Z, whereby the parallel combination of Zx and 10Z is equal to Z. This may be expressed as follows:

$$Z=\frac{(10Z)zx}{10Z+zx}$$

$$10Z+Zx=\frac{(10Z)Zx}{Z}$$

$$Zx=\frac{10}{9}Z$$

When switch 16*a* is closed, the impedance $$9Z+Z'=100Z/11$$

Hence, an impedance Zx in parallel with $100Z/11$ will provide a Z at terminals 22–23 where $$Z=\frac{\frac{100Z}{11}Zx}{\frac{100Z}{11}+Zx}$$

solving for Zx $$Zx\frac{100}{89}Z$$

Similarly, when switches 16*a* and 16*b* are closed, an impedance equal to $1000Z/889$ in parallel with $$9Z+Z'=1000Z/111$$

will provide Z at terminals 22–23.

When switches 16*a*, 16*b* and 16*c* are closed, an impedance equal to $10{,}000Z/8889$ in parallel with $$9Z+Z'=10{,}000Z/1{,}111$$

will provide Z at terminals 22–23.

Similarly, when switches 16*a*, 16*b*, 16*c* and 16*d* are closed, an impedance equal to $100{,}000Z/88889$ in parallel with $9Z+Z'=100{,}000Z/11{,}111$ provides Z at terminals 22–23.

In the same manner, when switches 16*a* through 16*e* are closed, an impedance equal to $10^6Z/888889$ in parallel with $9Z+Z'=10^6Z/111{,}111$ provides Z at terminals 22–23.

In general, the values for the impedances Zx to be placed in parallel with $9Z+Z'$ to achieve a value of Z at terminals 22–23 are:

$$Zx=Z\left[\frac{10+90+900+\ldots}{9+80+800+\ldots}\right] \quad (2)$$

From the foregoing Equation 2, the successive values of Zx are:

$Zx=10Z/9$; $100Z/89$; $1{,}000Z/889$; $10{,}000Z/889$; etc.

The conductance for each value of Zx is:

$$\frac{1}{Zx}=Yx=0.9/Z;\ 0.89/Z;\ 0.889/Z;\ 0.8889/Z;\ \text{etc.}$$

Starting with a conductance of $.888889/Z$ upon impressing a conductance of $.000001/Z$ in parallel with same will provide a resultant conductance of $.88889/Z$. If to this combination, one impresses another conductance of value $.00001/Z$ in parallel with same, the resultant conductance is $.8889/Z$. An additional conductance of $.0001/Z$ in parallel with same provides a total of $.889/Z$, and so on. Hence, as one adds conductances $.000001/Z$; $.00001/Z$; $.0001/Z$; $.001/Z$ and $.01/Z$ to $.888889/Z$, we provided values of:

$$Y=.88889/Z;\ .8889/Z;\ .889/Z;\ .89/Z \text{ and } .9/Z$$

A conductance of $.01/Z$ is a resistance of 100Z and this is resistor 25*a*. A conductance of $.001/Z$ is a resistance of 1,000Z and this is resistor 25*b*. A conductance of $.0001/Z$ is a resistance of 10,000Z and this is resistor 25*c*. Conductances 100,000Z and 1,000,000Z and these are respective resistors 25*d* and 25*e*. The conductance of $$.888888\ldots/Z$$

is a resistance of $9Z/8$ and this is resistor 24.

From the foregoing, the following table correlates the multiplier factors and the various resistors of the two sets 15 and 25 and whether they are in or out of the circuit, wherein the impedance looking into terminals 22–23 is maintained at the fixed value of Z (see Table A).

The foregoing values of $Zx$ and $Yx$ are satisfied by:

Resistor 24 in parallel with resistors 25*a* . . . *e*;
Resistor 24 in parallel with resistors 25*b* . . . *e*;
Resistor 24 in parallel with resistors 25*c* . . . *e*;
Resistor 24 in parallel with resistors 25*d, e*;
Resistor 24 in parallel with resistor 25*e*;
and finally just resistor 24.

As a result and from the foregoing, when switches 16*a* through 16*e* are all open, it was shown that $Zx$ should be $10Z/9$ and that this is obtained by closing all the switches 26*a* . . . 26*e* to provide the conductance $.9/Z$ and thus the resistance $10Z/9$. By the same reasoning with reference to the immediately preceding table, it is seen that when switch 16*a* is closed and switch 26*a* is opened, the desired $Zx$ is achieved, and so on, for each succeeding multiplier factor.

TABLE A

| Multiplier Factor | Switches of 16 Set Closed | Values of 9Z+Z′ | Switches of 26 Set Closed | Values of Zx | Values of Yx |
|---|---|---|---|---|---|
| .1 | ------------ | 10Z | 26a. . . . e. | 10Z/9 | .9/Z |
| .01 | 16a. | 100Z/11 | 26b, c, d, e. | 100Z/89 | .89/Z |
| .001 | 16a, b. | 1000Z/111 | 26c, d, e. | 1000Z/889 | .889/Z |
| .0001 | 16a, b, c. | 10,000Z/1,111 | 26d, e. | 10,000Z/8889 | .8889/Z |
| .00001 | 16a, b, c, d. | $10^5$Z/11,111 | 26e. | $10^5$Z/88889 | .88889/Z |
| .000001 | 16a. . . . e. | $10^6$Z/111,111 | ------------ | $10^6$Z/888889 | .888889/Z |

The values of resistors 24 and 25*a* . . . 25*e* may be synthesized from suitable components to render them easily intercompared by the standard "bootstrap" method. This is important since it assures the precision and accuracy of resistor 24 and the set of resistors 25*a* . . . *e* to maintain the overall precision and accuracy of the extended range ratio divided. As noted hereinbefore, the resistors as depicted in FIG. 1 have been intercompared against the input of divider 10, and thus divider 10 and respective resistors 17 and the set of 15*a* . . . 15*e* or combination thereof may be employed to measure and establish the accuracy of resistors 24 and 25*a* . . . 25*e*. For example, by placing resistor 24 of value $9Z/8$ in parallel with resistor 17 of value 9Z provides a resultant value of Z which is intercompared with the input Z of divider 10.

The 100Z resistor 25*a* is made up of four series resistors, three of which values 30Z each and the fourth has a value 10Z. To establish the accuracy of same by intercomparison, the three 30Z resistors are connected in parallel to provide a resultant of 10Z. This 10Z may be intercompared with the series combination of resistor 17 and Z input of divider 10. Similarly, the single 10Z resistor used to make up 25*a* is also intercompared with the series 9Z and Z resistors.

The value of 1,000Z for resistor 25*b* is made up of four series resistors, three of which have the value of 300Z each and the fourth 100Z. This may be intercompared by connecting the three 300Z resistors in parallel to provide a resultant of 100Z and compare same against the already precise resistor 25*a*. In the same manner, the single 100Z resistor used to make up 25*b* is also intercompared against resistor 25*a*.

The 10,000Z value for resistor 25*c* is made up of four series resistors, three of which have values of 3,000Z each and the fourth has a value of 1,000Z. By following the prior techniques, these are intercompared with the already measured and established 25*b*. In the same manner, one establishes resistors 25*d* and 25*e*.

Now that all resistors are intercompared and accurately established, if one extends the example previously proposed, i.e. let $Z=100K$, then resistor 24 equals 112,500 ohms. Resistor 25*a* equals 10 megs made up of the series combination of three resistors each 3 megs in series with a 1 meg resistor. Resistor 25*b* is thus four series resistors, three of which are each 30 megs and the fourth is 10 megs, and so on.

It is intended that all matter contained in the above description or shown in the accompanying drawings shall be interpreted as illustrative and not in a limiting sense.

What is claimed is:

1. A ratio divider for extending the range of a voltage divider system having an input of fixed value impedance and comprising, a first resistor synthesized by a series of resistors each of specified integral multiple value of said input impedance, a first set of plurality of resistors each of progressively decreasing decimal values with respect to the value of said divider input impedance, means for connecting individual ones of said resistors of said first set in parallel across said divider input, said first resistor being in series with the parallel combination of the divider input and the first set resistors in parallel therewith, and each resistor of said first set is synthesized by parallel combinations of resistors each having values which are selected ratios of multiples of ten of said divider input impedance, said synthesized resistors are further characterized by impedance values calibrated by accumulative intercomparisons while employing said divider input as the initial standard, wherein the range of said divider is variable by decimal multiples as respective resistors of said first set are impressed across said divider input.

2. A ratio divider for extending the range of a voltage divider system having an input of fixed value impedance and comprising, a first resistor of specified integral multiple value of said input impedance, a first set of plurality of resistors each of progressively decreasing decimal values with respect to the value of said divider input impedance, means for connecting individual ones of said resistors of said first set in parallel across said divider input, said first resistor being in series with the parallel combination of the divider input and the first set resistors in parallel therewith, said first resistor and each resistor of said first set are further characterized by impedance values calibrated by accumulative intercomparisons while employing said divider input as the initial standard, wherein the range of said divider is variable by decimal multiples as respective resistors of said first set are impressed across said divider input, a second resistor of specified fractional value of said divider input impedance, said second resistor being in parallel across the series combination made up of said first resistor and the parallel combination formed by said divider input and said first set resistors, a second set of plurality of resistors each of progressively increasing decimal values of said divider input impedance, means for connecting individual ones of said second set resistors in parallel across said second resistor in correlation with connection of individual ones of said first set resistors across said divider input, each resistor of said second set is synthesized by series combinations of resistors having impedance values which are selected ratios of multiples of ten of said divider input impedance, and said second set of synthesized resistors and said second resistor are further characterized by impedance values calibrated by accumulative intercomparison while employing said divider input and at least one previously intercompared resistor as the initial standard, wherein the input impedance of said system appearing across said second resistor is a constant value for various ranges of divider system output.

3. A ratio divider for extending the range of a voltage divider system having an input of constant value comprising, a first resistor having an impedance value nine times the value of said constant input impedance, said first resistor being synthesized by a series of resistors which are integral multiples of said divider input impedance, a plurality of $n$ resistors forming a first set, said last-mentioned resistors having progressively decreasing values of impedance equal to the value of said constant input impedance divided by ten to the $k$ power where $n$ and $k$ are whole number integers from 1 to $n$, means for connecting individual ones of said first set resistors in parallel across said divider input, said first resistor being in series with the parallel combination of said divider input and the first set resistors, and each resistor of said first set is synthesized by parallel combinations of resistors having values which are selected ratios of multiples of ten of said divider input impedance, and said synthesized resistors are further characterized by impedance values calibrated by accumulative intercomparisons in the order of their magnitudes while employing said divider input as the initial standard, wherein the range of said divider is variable by decimal multiples as respective ones of said first set resistors are impressed across said divider input.

4. A system as defined in claim 3, wherein said first resistor comprising three resistors in series each having a value of three times the value of said constant input impedance, and successive ones of the $n$ resistors of said first set comprising three parallel resistors each of value three times said constant input impedance divided by ten to the $k$ power, where $n$ and $k$ are integers 1, 2, 3 . . . $n$.

5. A system as defined in claim 3 further including, a second resistor having an impedance value of $9Z/8$ where the value of Z equals the constant input impedance, said second resistor being in parallel across the series combination made up of said first resistor and the parallel combination formed by said divider input and said first set resistors, a second set of plurality of $n$ resistors each having progressively increasing values of impedance equal to $Z \cdot 10^{(k+1)}$, mean for connecting individual ones of said second set resistors in parallel across said second resistor in correlation with connection of individual ones of said first set resistors across said divider input, each resistor of said second set being synthesized by series combinations of resistors having impedance values which are selected ratios of multiples of ten of said divider input impedance, and said second set of synthesized resistors and said second resistor are further characterized by impedance values calibrated in the order of their magnitudes by accumulative intercomparison while employing said divider input and at least one previously intercompared resistor as the initial standard, wherein the input impedance of said system appearing across said second resistor is a constant value for various ranges of divider system output.

6. A system as defined in claim 5, wherein the connection of the resistors of said first and second sets being correlated as follows:

when all resistors of said first set are disconnected with respect to said circuit, all resistors of said second set are connected across said second resistor;

when resistor $Z/10$ of said first set is connected across Z, said second set resistor $Z \cdot 10^2$ is disconnected from said circuit;

when said first set resistors $Z/10$ and $Z/10^2$ are connected across Z, said second set resistors $Z \cdot 10^2$ and $Z \cdot 10^3$ are disconnected from said circuit;

when said first resistors $Z/10$, $Z/10^2$ and $Z/10^3$ are connected across Z, said second set resistors $Z \cdot 10^2$, $Z \cdot 10^3$ and $Z \cdot 10^4$ are disconnected from said circuit;

wherein the foregoing sequence continues until when all resistors of said first set are connected across Z, all resistors of said second set are disconnected with repect to said circuit.

7. A system as defined in claim 5, wherein successive $n$ resistors of said second set each comprising a series combination of resistors three of which each have the value $3Z10^k$ and the fourth resistor a value of $Z10^k$ where $n$ and $k$ are integers 1, 2, 3, . . . $n$.

8. A system as defined in claim 7, wherein said first resistor comprising three resistors in series each having a value 3Z, and wherein successive ones of the $n$ resistors of said first set comprising three parallel resistors each of value $3Z/10^k$, where $n$ and $k$ are integers 1, 2, 3, . . . $n$.

9. A ratio divider for extending the range of a voltage divider, wherein said voltage divider is characterized by a fixed-constant input impedance of value Z and the output of the extended range divider provides decimally related ranges comprising, a first set of $n$ resistors each having a progressively smaller value of resistance and each resistance value thereof is decimally related to Z, means for selectively connecting said resistors so that each may be individually impressed in parallel across said divider input, a first resistor having a value which is an integral multiple of Z in series with the parallel combination made up of said divider input and the individual $n$ resistors in parallel with said divider input, each resistor of said first set is synthesized by parallel combinations of resistors having values which are selected ratios of multiples of ten of said divider input impedance, said first resistor is synthesized by series resistors having values which are integral multiples of Z, and said synthesized resistors are further characterized by impedance values calibrated by accumulative intercomparisons in the order of their magnitudes while employing said divider input as the initial standard, wherein the output range of said system is decimally variable by impressing individual ones of said $n$ resistors in parallel across said divider input.

10. A system as defined in claim 9 further comprising, a second resistor having a fractional value of Z connected in parallel across the series combination made up of said first resistor and the parallel combination of the divider input and said first set resistors in parallel therewith, a second set of $n$ resistors each having impedance of progressively increasing multiples of ten with respect to the value of Z, means for selectively connecting said second set resistors individually in parallel across said second resistor in correlation with disconnection of the individual ones of said first set resistors across said divider input, each resistor of said second set is synthesized by series combinations of resistors having impedance values which are selected ratios of multiples of ten of said divider input impedance, and said second set of synthesized resistors and said second resistor are further characterized by impedance values calibrated in the order of their magnitudes by accumulative intercomparisons while employing said divider input and at least one previously intercompared resistor as the initial standard, whereby the input impedance of said system across said second resistor is a constant value for various ranges of divider system output.

(References on following page)

References Cited by the Examiner

UNITED STATES PATENTS

| | | | |
|---|---|---|---|
| 1,617,145 | 2/1927 | Brown | 324—115 |
| 2,157,973 | 5/1939 | Wenger | 324—115 X |
| 2,167,162 | 7/1939 | Terman | 324—115 X |
| 2,813,987 | 11/1957 | Taylor | 323—74 X |
| 2,874,354 | 2/1959 | Bell | 324—130 |

| | | | |
|---|---|---|---|
| 2,876,417 | 3/1959 | Winram | 324—130 X |
| 2,999,202 | 9/1961 | Ule | 323—79 X |

OTHER REFERENCES

Turner: "D.C. Signal Sourse" Electronics, pages 198, 200, 202, 204, February 1956.

JOHN F. COUCH, *Primary Examiner.*

A. D. PELLINEN, *Assistant Examiner.*